(12) United States Patent
Reohr, Jr. et al.

(10) Patent No.: US 7,088,735 B1
(45) Date of Patent: Aug. 8, 2006

(54) PROCESSING DATA PACKETS IN A MULTIPLE PROTOCOL SYSTEM AREA NETWORK

(75) Inventors: Richard D. Reohr, Jr., Hillsboro, OR (US); Joseph E. Pelissier, Hillsboro, OR (US); Joseph I. Chamdani, Santa Clara, CA (US)

(73) Assignee: Sanera Systems, Inc., Broomfield, CO (US)

( * ) Notice: Subject to any disclaimer, the term of this patent is extended or adjusted under 35 U.S.C. 154(b) by 981 days.

(21) Appl. No.: 10/071,969

(22) Filed: Feb. 5, 2002

(51) Int. Cl.
*H04L 12/26* (2006.01)
(52) U.S. Cl. .................................................. 370/466
(58) Field of Classification Search ................ 370/465, 370/466, 467
See application file for complete search history.

(56) References Cited

U.S. PATENT DOCUMENTS 5,949,856 A * 9/1999 Stoller et al. ............... 361/788
5,974,474 A * 10/1999 Furner et al. ................... 710/8

OTHER PUBLICATIONS

U.S. Appl. No. 10/072,581, filed Feb. 5, 2002, entitled "*Forwarding Data Packets In A System Area Network*," 52 total pages.
U.S. Appl. No. 10/072,059, filed Feb. 5, 2002, entitled "*Transmitting Data Packets In A System Area Network*," 57 total pages.
U.S. Appl. No. 10/072,060, filed Feb. 5, 2002, entitled "*Communicating Data Packets In A Multiple Protocol System Area Network*," 52 total pages.

* cited by examiner

*Primary Examiner*—Melvin Marcelo
(74) *Attorney, Agent, or Firm*—Hensley Kim & Edgington, LLC

(57) ABSTRACT

Processing a data packet in a multiple protocol system area network is disclosed. A paddle card comprising a first paddle card that supports a first communication protocol or a second paddle card that supports a second communication protocol is received. The communication protocol supported by the received paddle card is identified. Data packets from the received paddle card are processed according to the identified communication protocol.

17 Claims, 13 Drawing Sheets

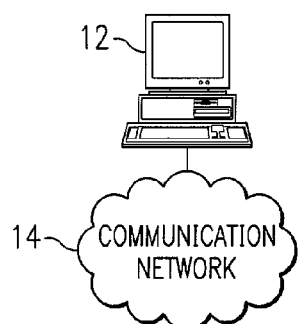
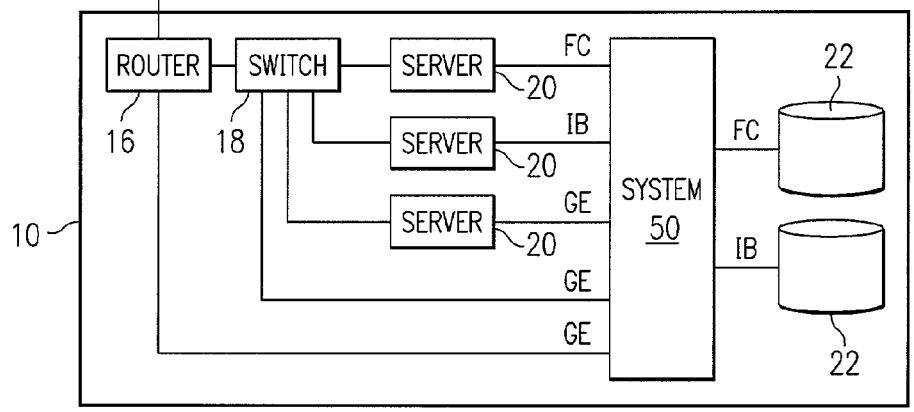
FIG. 1
FIG. 3
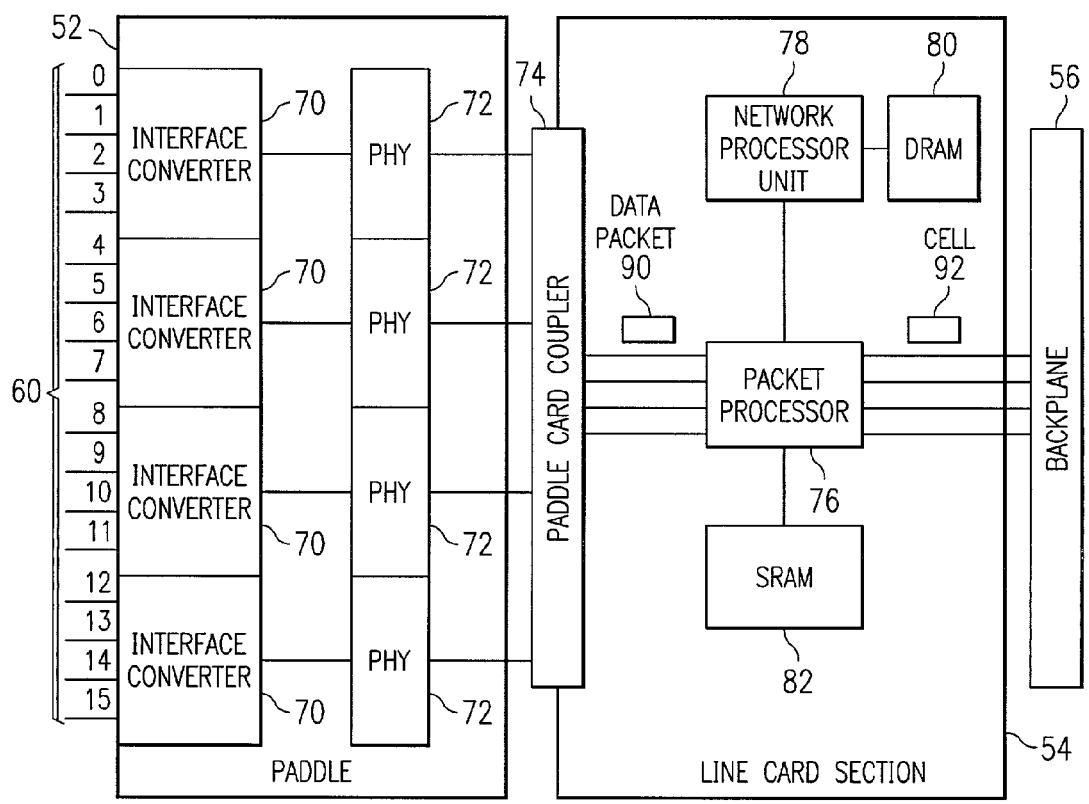

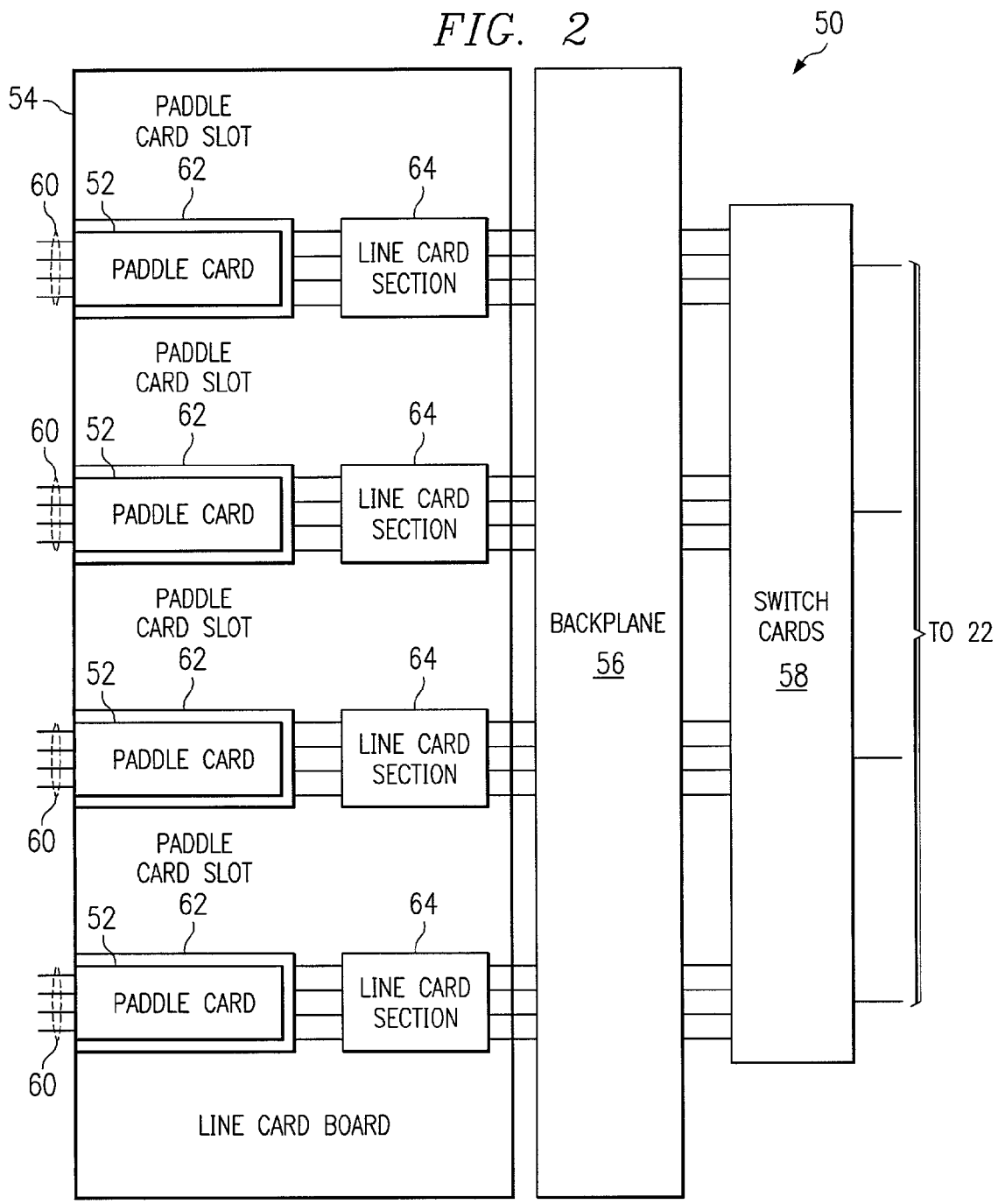

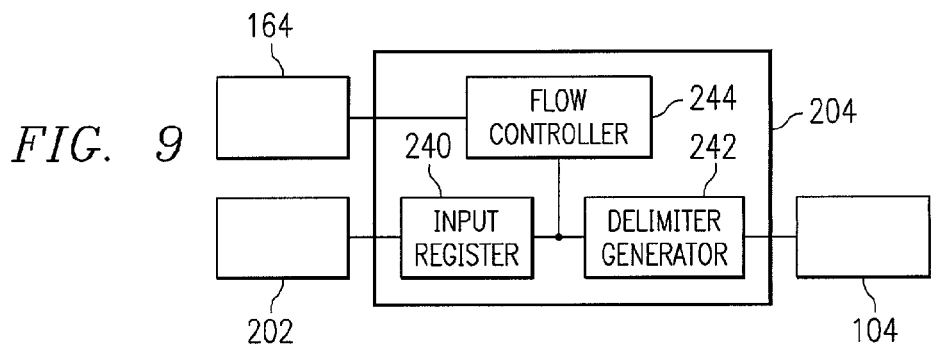
FIG. 9
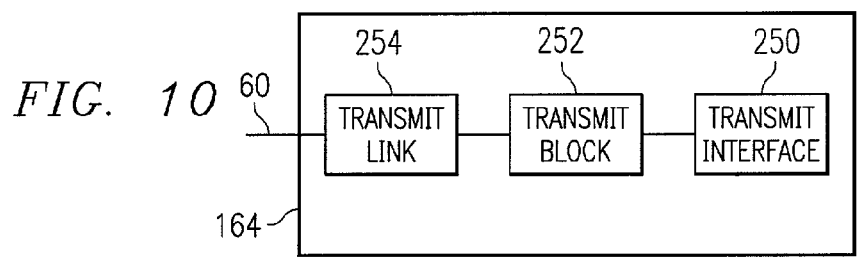
FIG. 10
FIG. 11
FIG. 12

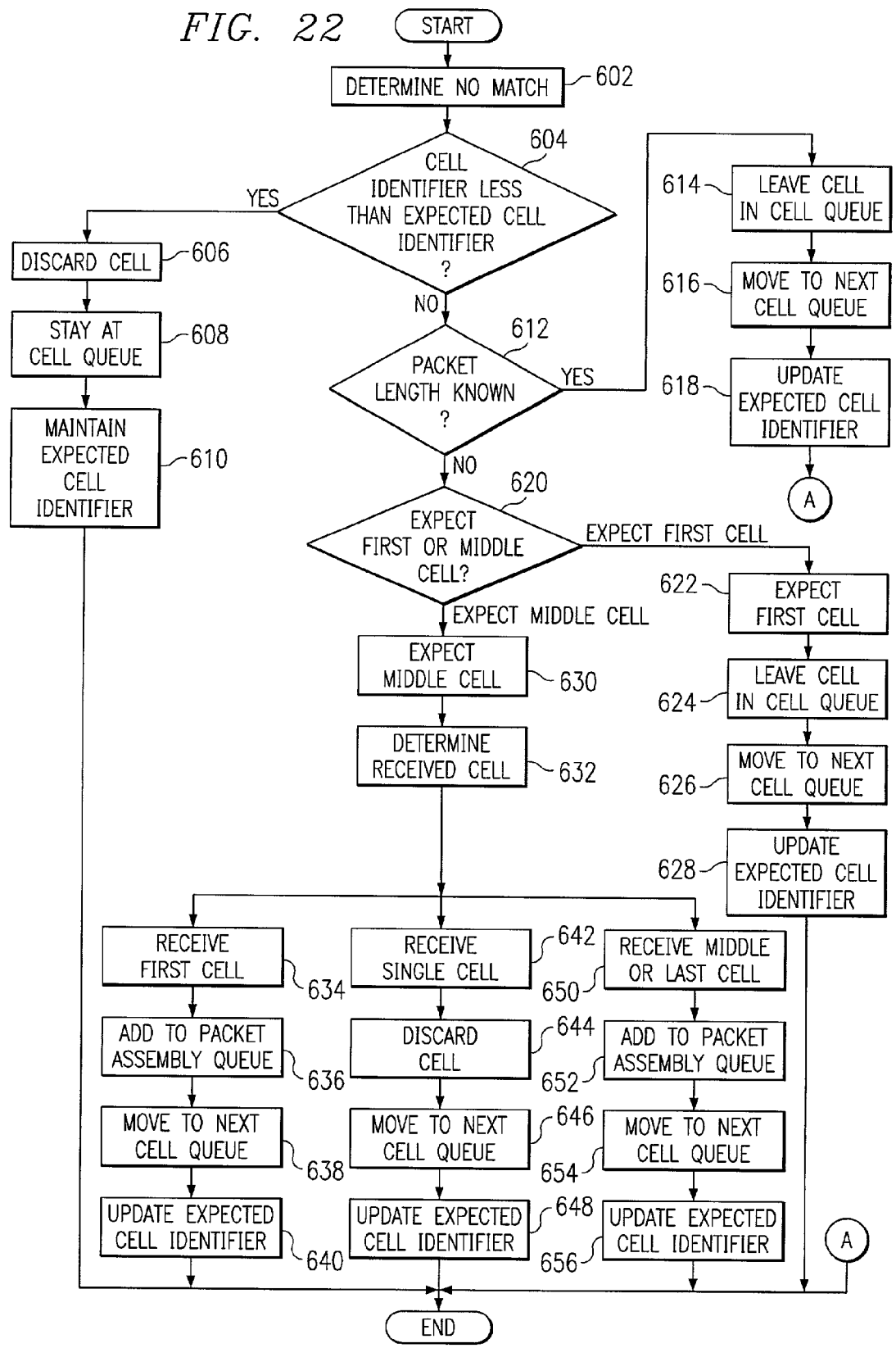

PROCESSING DATA PACKETS IN A MULTIPLE PROTOCOL SYSTEM AREA NETWORK

RELATED APPLICATIONS

This application is related to U.S. patent application Ser. No. 10/072,581, entitled "FORWARDING DATA PACKETS IN A SYSTEM AREA NETWORK," to U.S. patent application Ser. No. 10/072,059, entitled "TRANSMITTING DATA PACKETS IN A SYSTEM AREA NETWORK," and to U.S. patent application Ser. No. 10/072,060, entitled "COMMUNICATING DATA PACKETS IN A MULTIPLE PROTOCOL SYSTEM AREA NETWORK," all filed concurrently with the present application.

TECHNICAL FIELD OF THE INVENTION

This invention relates generally to the field of data networks and more specifically to processing data packets in multiple protocol a system area network.

BACKGROUND OF THE INVENTION

Storage area networks typically store data from many different sources. Data from different sources, however, are often based on different communication protocols. Consequently, some storage area networks are inadequate for storing data from multiple sources.

SUMMARY OF THE INVENTION

In accordance with the present invention, embodiments of the invention are provided that may reduce the disadvantages and problems associated with previously developed systems and methods.

According to one embodiment of the present invention, processing a data packet is disclosed. A paddle card comprising a first paddle card that supports a first communication protocol or a second paddle card that supports a second communication protocol is received. The communication protocol supported by the received paddle card is identified. Data packets from the received paddle card are received and processed according to the identified communication protocol. The data packets are transmitted to a switch card.

Certain embodiments of the invention may provide numerous technical advantages. A technical advantage of one example is that a system may reconfigure itself to support any of a number of communication protocols. A line card section receives a paddle card that supports a specific communication protocol. The line card section identifies the communication protocol and reconfigures itself to support the communication protocol. Consequently, the system may support any of a number of communication protocols, which may provide more effective data storage.

Other technical advantages of the present invention will be readily apparent to one skilled in the art from the following figures, description, and claims. Moreover, while specific advantages have been enumerated above, various embodiments may include all, some, or none of the enumerated advantages.

BRIEF DESCRIPTION OF THE DRAWINGS

For a more complete understanding of the present invention and for further features and advantages, reference is now made to the following description, taken in conjunction with the accompanying drawings, in which:

FIG. 1 is a block diagram illustrating one example of a system area network for communicating and storing data;

FIG. 2 is a block diagram illustrating one example of a system for processing data packets;

FIG. 3 is a block diagram illustrating examples of the paddle card and the line card section of FIG. 2;

FIG. 9 is a block diagram illustrating one example of the receive interface of FIG. 6;

FIG. 10 is a block diagram illustrating one example of the transmitting control unit of FIG. 4;

FIG. 11 is a block diagram illustrating one example of the transmit interface of FIG. 10;

FIG. 12 is a block diagram illustrating one example of the transmit block of FIG. 10;

FIG. 22 is a flowchart illustrating one example of a recovery procedure for assembling cells into a data packet at receiving packet processor.

DETAILED DESCRIPTION OF THE DRAWINGS

Figure 4:
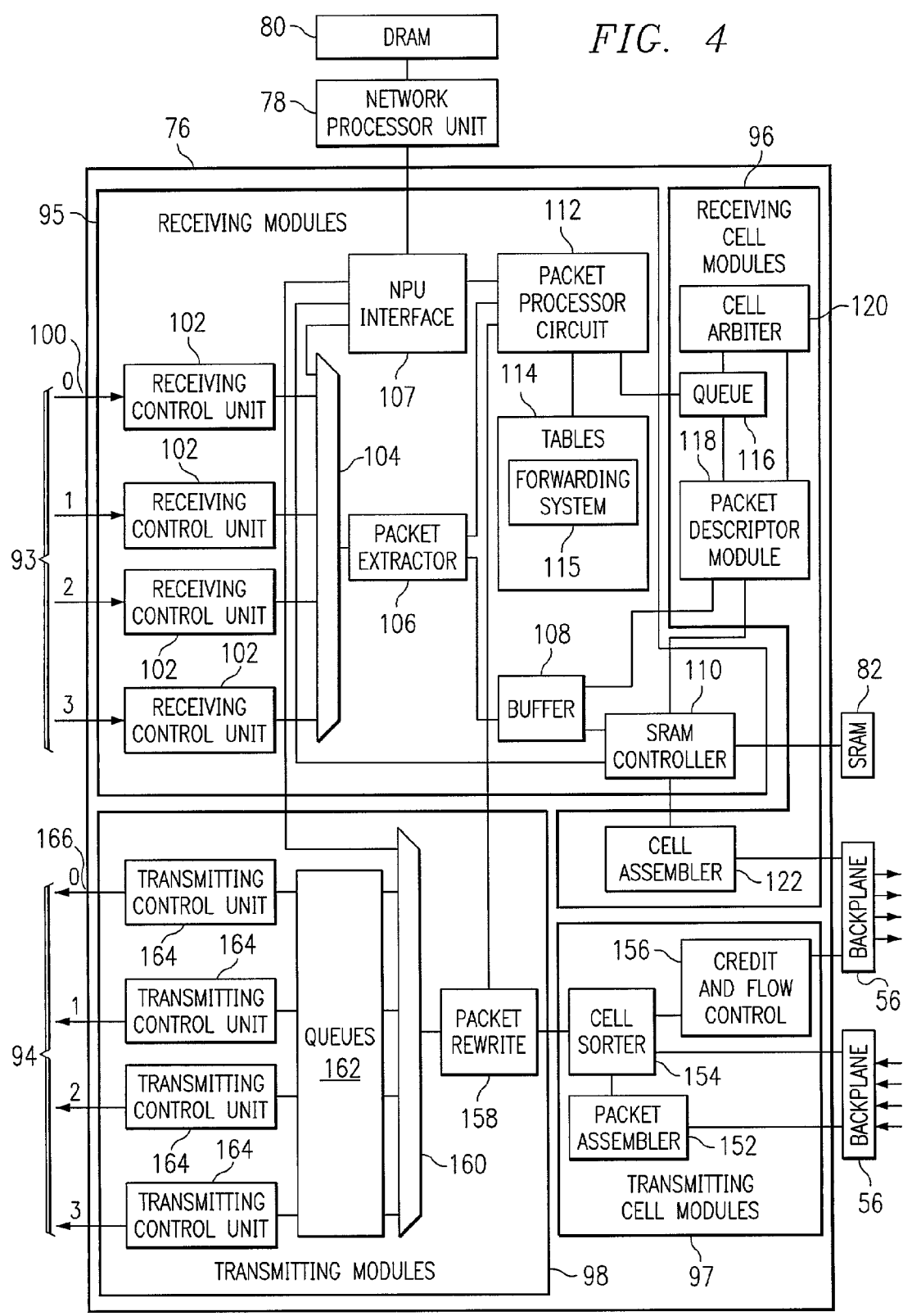
FIG. 4 is a block diagram illustrating one example of the packet processor of FIG. 3.

FIG. 1 is a block diagram illustrating one example of a system area network 10 for communicating and storing data. System area network 10 provides for the communication and storage of data based on any of a number of communication protocols, for example, InfiniBand (IB), Gigabit Ethernet (GE), or Fibre Channel (FC).

One or more remote devices 12 communicate with system area network 10 through a communications network 14. Remote devices 12 may include appropriate input devices, output devices, storage media, processors, memory, or other devices for receiving, processing, storing, and communicating data. Communications network 14 may include a public switched telephone network (PSTN), a public or private data network, the Internet, a wired or wireless network, a local, regional, or global communications network, or any other network suitable for communicating data to system area network 10. Communications network 14 communicates data to a router 16, which in turn may communicate data to a switch 18 or to a system 50 for processing data packets. Switch 18 may communicate data to one or more servers 20 or to system 50.

System 50 communicates with router 16, switch 18, and servers 20, which may each support a different communication protocol. "Each" as used in this document refers to each member of a set or each member of a subset of the set. For example, router 16 and switch 18 may use an Ethernet communication protocol, while servers 20 may use a Fibre Channel, Infiniband, or Ethernet communication protocol. System 50 stores and retrieves data in one or more databases 22. System 50 may communicate with databases 22 using any suitable communication protocol such as a Fibre Channel or Infiniband communication protocols. System 50 provides for the storage and retrieval of data based on multiple communication protocols.

FIG. 2 is a block diagram illustrating one example of a system 50 for processing data packets. System 50 processes data packets received from communications network 14, which may be based on any of a number of communication protocols, for storage in databases 22. System 50 may comprise logic encoded in any suitable media such as hardware, firmware, or software or any combination of the preceding. System 50 includes one or more paddle cards 52, a line card board 54, a backplane 56, and one or more switch cards 58.

Paddle cards 52 receive data packets from one or more physical links 60. Physical links 60 may comprise, for example, optical fiber cables or other fibers suitable for communicating data packets. Paddle cards perform physical layer packet processing, for example, Layer 1 processing of the Open Systems Interconnection (OSI) model, on the data packets. For example, paddle cards 52 may perform optical-to-electrical and electrical-to-optical conversion, and may perform serial-differential to parallel-digital and parallel-digital to serial-differential conversion. A paddle card 52 is associated with any suitable communication protocol, for example, InfiniBand (IB), Ethernet (GE), or Fibre Channel (FC) communication protocols, and processes data packets according to the communication protocol. Paddle card 52 may include a physical identifier such as a pin configuration that is used by line card board 54 to identify the communication protocol.

Line card board 54 includes paddle card slots 62 that receive paddle cards 52. A paddle card 52 that is inserted into paddle card slot 62 is coupled to a line card section 64. Line card section 64 identifies the communication protocol associated with paddle card 52 and processes data packets according to the communication protocol. Line card section 52 may identify the communication protocol by reading a physical identifier such as a pin configuration of paddle card 52. Backplane 56 couples line card board 54 to switch cards 58. Switch cards 58 communicate the data packets to databases 22.

FIG. 3 is a block diagram illustrating examples of paddle card 52 and line card section 54 of FIG. 2. Paddle card 52 may include one or more interface converters 70 coupled to one or more physical layer chips (PHY) 72. Interface converters 70 are coupled to physical links 60, and perform optical-to-electrical and electrical-to-optical conversions.

Interface converters 70 may comprise, for example, gigabit interface converters (GBIC) having any suitable port such as an InfiniBand, Ethernet, or Fibre Channel port, that supports any suitable speed. Physical layer chip 72 performs physical layer conversions on data packets, for example, clock recovery, framing, 10b/8b decoding, and deserialization. Interface converter 70 and physical layer chip 72 may accommodate any suitable number of physical links 60. Physical links 60 are labeled link 0 through link 15. In the illustrated example, an interface converter 70 and a physical layer chip 72 accommodate four physical links 60.

Paddle card coupler 74 couples paddle card 52 to line card section 54. Paddle card coupler 74 may be coupled to paddle cards 52 that are associated with any of a number of communication protocols. For example, paddle card coupler 74 may be coupled to a paddle card 52 that is associated with an InfiniBand communication protocol, or to a different paddle card 52 associated with an Ethernet communication protocol and a Fibre Channel communication protocol. Packet processor 76 performs data link switching such as Layer 2 switching of the OSI model and network routing such as Layer 3 routing of the OSI model according to the appropriate communication protocol. Packet processor 76 is described in more detail with reference to FIG. 4.

Network processor unit (NPU) 78 performs data packet processing such as Layer 4 through Layer 7 processing of the OSI model on data packets received from packet processor 76. For example, network processor unit 78 may perform protocol conversion, server bypassing, and/or transmission control protocol (TCP) connection and termination. Network processor unit 78 may also handle management and control packets. Network processor unit 78 may use dynamic random access memory (DRAM) 80 to perform packet processing such as protocol conversion or server bypassing. Packet processor 76 may use static random access memory (SRAM) 82 to perform dynamic packet buffering.

Packet Processor

FIG. 4 is a block diagram illustrating one example of packet processor 76 of FIG. 3. Packet processor 76 identifies the communication protocol of paddle card 52 to which packet processor 76 is coupled, and processes data packets according to the identified communication protocol. Packet processor 76 includes a receiving portion 93 that receives data packets through paddle card 52 and transmits the data packets to switch cards 58, and a transmitting portion 94 that receives data packets from switch cards 58 and transmits the data packets through paddle card 52.

Receiving portion 93 includes ingress ports 100 that receive data packets through paddle card 52. In the illustrated example, ingress ports 100 are labeled port 0 through port 3. Ingress port 100 operates at a data rate suitable for the communication protocol, for example, 0.85 Gbps for 1G Fibre Channel, 1.7 Gbps for 2G Fibre Channel, 1 Gbps for 1 G Ethernet, 10 Gbps for 10 G Ethernet, 2 Gbps for 1× InfiniBand, or 8 Gbps for 4× InfiniBand.

Receiving control units 102 perform media access control operations. Receiving control unit 102 identifies the communication protocol associated with paddle card 52 and configures itself to communicate data packets between paddle card 52 and packet processor 76 according to the communication protocol. Data packets based on any of a number of communication protocols may be converted to the generic format. Receiving control unit 102 may be responsible for implementing, for example, link initialization, clock recovery, and lane deskew for multi-lane links. Receiving control unit 102 is described in more detail with reference to FIG. 7.

A multiplexer 104 selects data packets from receiving control units 102 or an NPU interface 107 and passes them to a packet extractor 106. Packet extractor 106 performs decoding and processing according to the communication protocol. For example, packet extractor 106 may identify the header of a data packet, merge byte streams, and drop padding or unused byte streams. Packet extractor 106 may also check for errors, drop data packets with errors, and record the errors. Packet extractor 106 stores data packets and data packet information in buffer 108, and SRAM controller 110 schedules slots for buffer 108. Data packet information may include, for example, a data packet head-of-chain pointer. Network processor unit (NPU) interface 107 transmits data packets to network processor unit 78.

Packet processor circuit 112 processes data packets received from packet extractor 106 to route data packets according to the communication protocol. For example, packet processor circuit 112 may perform switching and multicasting for Ethernet, InfiniBand, or Fibre Channel data packets, and may perform routing for Ethernet or InfiniBand data packets. Packet processor circuit 112 may access tables 114 to process the data packets. Tables 114 may include a forwarding system 115 that associates destination addresses with port identifiers. Forwarding system is described in more detail with reference to FIGS. 14 through 18. Packet processor circuit 112 may store data packets and data packet information in queue 116. Packet information may include, for example, a destination port identifier, source port identifier, data packet length, or data packet age.

Receiving cell modules 96 convert data packets to cells. Packet descriptor module 118 receives data packet information from queue 116 and buffer 108. A cell arbiter 120 segments a data packet into cells for delivery to backplane 56. A cell assembler 122 assembles the cells and sends the cells to backplane 56, which transmits the cells to switch cards 58.

Transmitting portion 94 receives cells from switch cards 58 through backplane 56. Transmitting cell modules 97 convert cells to data packets. A packet assembler 152 receives cell payload, and a cell sorter 154 receives cell headers. Cell sorter 154 sorts cell payload into data packets according to the cell headers. A credit and flow control module 156 processes flow control credit cells received from cell sorter 154. A packet rewrite module 158 receives assembled packets from cell sorter 154. Packet rewrite module 158 sends data packets that include rewrite indications to packet processor circuit 112 for a packet rewrite.

A demultiplexer 160 receives data packets from packet rewrite 158 and sends the data packets to network processor unit 78 for further processing or to queues 162 for transmission to paddle card 52. Queues 162 send data packets to transmitting control units 164. Transmitting control units 164 perform media access control operations, and convert the data from a general format to a format specific to the communication protocol associated with paddle card 52. Transmitting control units 164 are described in more detail with reference to FIG. 11. Transmitting control units 164 send the data packets paddle card 52 via to egress ports 166. Egress ports 166 correspond to ingress ports 100. In the illustrated example, egress ports 166 labeled port 0 through port 3 correspond to ingress ports 100 labeled port 0 through port 3, respectively.

Figure 5:
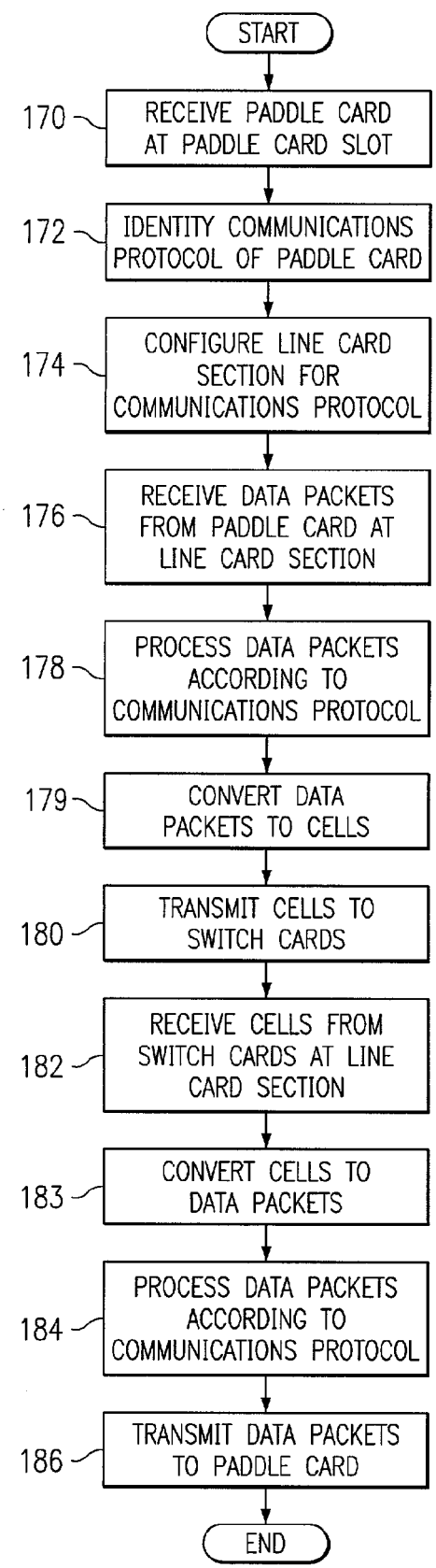
FIG. 5 is a flowchart illustrating one example of a method for processing a data packet.

FIG. 5 is a flowchart illustrating one example of a method for processing a data packet. The method allows for data packets based on any of a number of communication protocols to be stored in databases 22. The method begins at step 170, where paddle card 52 is received at paddle card slot 62. The communication protocol of paddle card 52 is identified at step 172. Packet processor 76 of line card section 54 may identify the communication protocol by detecting a physical identifier such as a pin configuration of paddle card 52. At step 174, line card section 64 is configured according to the communication protocol. Line card section 64 is configured to process data packets based on the communication protocol. An example of configuring line card section 64 is described in more detail with reference to FIG. 8.

At step 176, data packets from paddle card 52 are received at line card section 64. The data packets are processed according to the communication protocol at step 178. Processing data packets is described in more detail with reference to FIG. 4. Data packets are converted to cells at step 179. The cells are transmitted to switch card 58 at step 180.

Cells from switch cards 58 are received at line card section 64 at step 182. The cells are converted to data packets at step 183. At step 184, the data packets are processed according to the communication protocol. The processing of the data packets is described in more detail with reference to FIG. 4. At step 186, data packets are transmitted to paddle card 52. After transmitting the data packets, the method terminates.

Receiving and Transmitting Control Units

Figure 6:
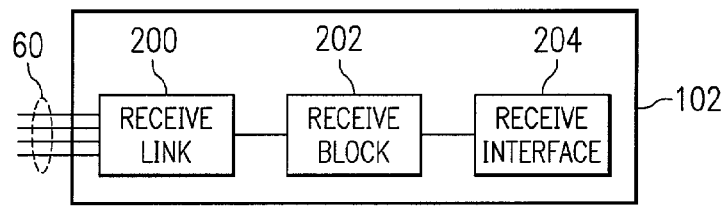
FIG. 6 is a block diagram illustrating one example of the receiving control unit of FIG. 4.

FIG. 6 is a block diagram illustrating one example of receiving control unit 102 of FIG. 4. Receiving control unit 102 provides an interface between paddle card 52 and packet processor 76. Receiving control unit 102 identifies a communication protocol associated with paddle card 52 and processes packets according to the communication protocol.

Receiving control unit 102 includes a receive link 200, a receive block 202, and a receive interface 204, which are described in more detail with reference to FIGS. 7 through 9. Data packets and control signals from paddle card 52 travel through receive link 200, receive block 202, and receive interface 204, and then to packet processor 76. Receiving control unit 102 may handle data packets from any suitable number of physical links 60, and any suitable number of receiving control units 102 may be coupled to paddle card 52.

Receiving control unit 102 establishes a communication link for data communication by synchronizing and conditioning the communication link according to the communication protocol associated with paddle card 52. Receiving control unit 102 may communicate with transmitting control unit 164 to establish the communication link. Receiving control unit 102 performs data packet reception operations, for example, decoding data packets and/or checking data packet validity. Receiving control unit 102 may check data packet validity by, for example, performing cyclic redundancy check (CRC) validation or other validation operation.

Receiving control unit 102 also performs flow control operations. Receiving control unit 102 may examine a received data packet stream for flow control information. The flow control information may be used to determine whether transmitter control unit 164 may transmit scheduled data packets. Receiving control unit 102 may also generate flow control information that is transmitted by packet processor 76.

Figure 7:
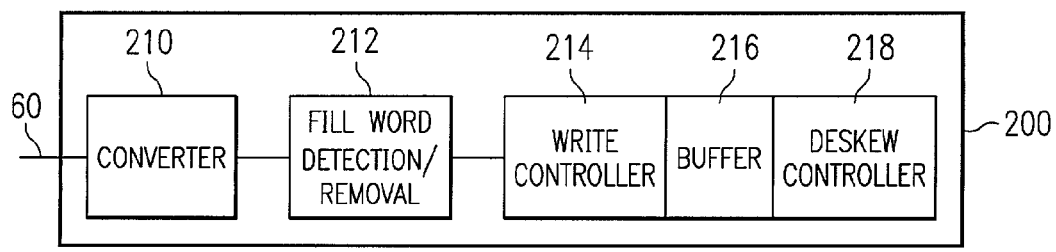
FIG. 7 is a block diagram illustrating one example of the receive link of FIG. 6.

FIG. 7 is a block diagram illustrating one example of a receive link 200 of FIG. 6. Receive link 200 may be associated with any suitable number of physical links 60.

Paddle card 52 may use any suitable configuration of lanes and links 200 to support a communication protocol. A physical link 60 may comprise multiple lanes. A lane refers to a single data path. Lanes may be routed through corresponding ingress ports 100 and egress ports 166.

TABLE 1

| Communication protocol Type | | A | | B | | C | | D |
|---|---|---|---|---|---|---|---|---|
| Lane | 0 | Port | 0 | Port | 0 | Port | 0 | Port 0 |
| | 1 | | | | 0 | | 0 | 1 |
| | 2 | | | | 0 | | 0 | 2 |
| | 3 | | | | 0 | | 0 | 3 |
| | 4 | | 1 | | 1 | | 0 | 4 |
| | 5 | | | | 1 | | 0 | 5 |
| | 6 | | | | 1 | | 0 | 6 |
| | 7 | | | | 1 | | 0 | 7 |
| | 8 | | 2 | | 2 | | 0 | 8 |
| | 9 | | | | 2 | | 0 | 9 |
| | 10 | | | | 2 | | 0 | 10 |
| | 11 | | | | 2 | | 0 | 11 |
| | 12 | | 3 | | 3 | | 3 | 12 |
| | 13 | | | | 3 | | 3 | 13 |
| | 14 | | | | 3 | | 3 | 14 |
| | 15 | | | | 3 | | 3 | 15 |

TABLE 1 illustrates examples of configurations of lanes and ports 100 and 166 according to a type of communication protocol. The lane numbers are illustrated in FIG. 3, and the port numbers are illustrated in FIG. 4. According to TABLE 1, paddle card 52 supporting a communication protocol of type A, such as a 1× InfiniBand, 1G or 2G Fibre Channel, or 1G Ethernet communication protocol may use receive links 200 associated with lanes 0, 4, 8, and 12 routed through ports 0, 1, 2, and 3, respectively. Paddle card 52 that supports a type B communication protocol such as a 4× InfiniBand, 10G Ethernet, or 10G Fibre Channel communication protocol may use receive links 200 associated with lanes 0 through 16 divided into four ports, for example, lanes 0 through 3 routed through port 0, lanes 4 through 7 routed through port 1, etc. Paddle card 52 that supports a type C communication protocol such as a 12× InfiniBand communication protocol may use receive links 200 associated with lanes 0 through 16 divided into two ports, for example, lanes 0 through 11 routed through port 0, and lanes 12 through 15 are routed through port 3. Paddle card 52 that supports a type D communication protocol may use receive links 200 associated with lanes 0 through 16 routed through ports 0 through 16, for example, lane 0 routed through port 0, lane 1 routed through port 1, etc.

Receive link 200 may include a converter 210, a fill word detection/removal module 212, a write controller 214, a buffer 216, and a deskew controller 218. Converter 210 supports double data rate operation by assembling double data rate characters into two character-wide single data rate words. Fill word detection/removal module 212 identifies characters such as fill words that may be dropped for clock recovery/tolerance purposes. Fill word detection/removal module 212 notifies write controller 214 of the alignment and position of the characters that may be dropped from the received data stream. Write controller 214 determines the amount of data stored in buffer 216, and adjusts the amount of data written to buffer 216 in response to the amount of data stored in buffer 216. For example, if write controller 214 determines that buffer 216 includes more than a predetermined amount of data, write controller 214 may reorder or drop characters. Buffer 216 may comprise, for example, a first in-first out (FIFO) buffer.

Deskew controller 218 manages the skew between multiple lanes routed to a single port. Skew describes the difference in the travel times of data packets traveling along different lanes. Lanes may be skewed by several clock cycles. Deskew controller 218 determines whether lanes are skewed and aligns, or deskews, lanes according to the appropriate protocol. Whether deskewing is required may depend on the protocol of paddle card 52. For example, data packets from a paddle card 52 configured for 4× or 12× InfiniBand, 10GE Ethernet, or 10G Fibre Channel may require deskewing.

Figure 8:
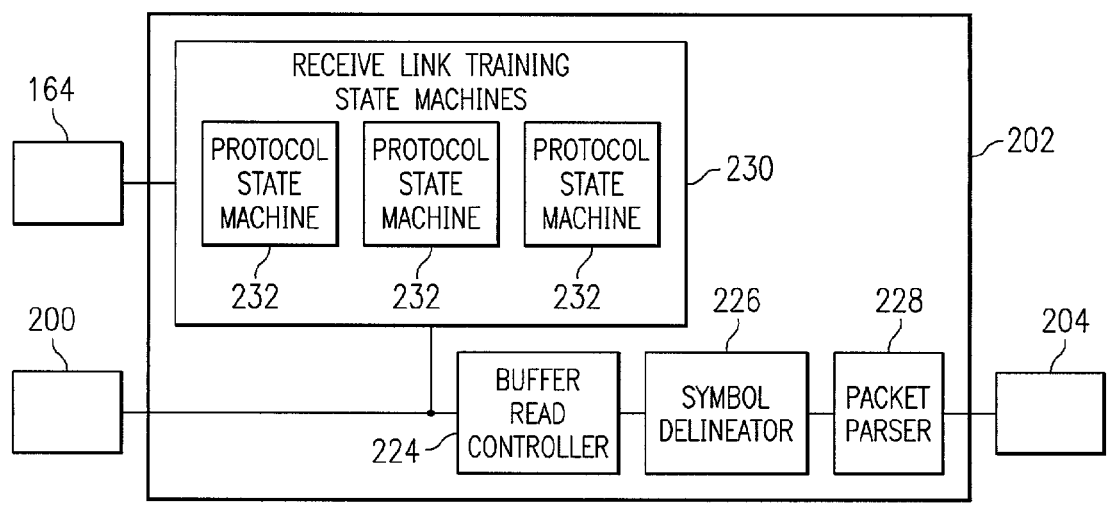
FIG. 8 is a block diagram illustrating one example of the receive block of FIG. 6.

FIG. 8 is a block diagram illustrating one example of receive block 202 of FIG. 6. Receive block 202 checks for link level and data packet errors and forwards data packets and status information to receive interface 204. Receive block 202 may include a buffer read controller 224, a symbol delineator 226, a packet parser 228, and receive link training state machines 230. Buffer read controller 224 receives multiple lanes of data and generates a data packet stream from the received data. Symbol delineator 226 detects a start and an end of packet delimiter and checks for link level errors. Packet parser 228 checks for data packet errors, and may, for example, check a CRC sequence associated with a data packet. Packet parser 228 may access a buffer that includes instructions for checking data packets according to multiple communication protocols. Packet parser 228 may be configured to use the instructions for the communication protocol associated with paddle card 52.

Receive link training state machines 230 implements link synchronization operations. Receive link training state machines 230 include protocol state machines 232 that each implement link training operations for a specific communication protocol. Protocol state machine 232 for the communication protocol of paddle 52 sends link synchronization instructions to a buffer of transmitting control unit 164. A transmit link training state machine of transmitting control unit 164 processes the instructions in order to establish the communication link.

FIG. 9 is a block diagram illustrating one example of receive interface 204 of FIG. 6. Receive interface 204 controls the flow of data packets. Receive interface 204 may include an input register 240, a delimiter generator 242, and a flow controller 244. Input register 240 receives data packets from receive block 202. Delimiter generator 242 provides control signals to packet processor 76 based on status and error indications received from receive block 202. Flow controller 244 detects flow control packets and parses relevant flow control information from the flow control packets. Flow controller 244 communicates with transmitting control unit 164 to adjust transmission of data packets to paddle card 52 in response to the flow control information.

FIG. 10 is a block diagram illustrating one example of transmitting control unit 164 of FIG. 4. Transmitting control unit 164 provides an interface between packet processor 76 and a paddle card 52. Transmitting control unit 164 may be configured to support a communication protocol associated with paddle card 52.

Transmitting control unit 164 may include a transmit interface 250, a transmit block 252, and a transmit link 254. Transmit interface 250 and transmit block 252 are described in more detail with reference to FIGS. 11 and 12. A packet from packet processor 76 is communicated through transmit interface 250, transmit block 252, and transmit link 254, and then to paddle card 52.

Transmitting control unit 164 performs data packet transmission operations. Transmit interface 250 receives generic data packets and extracts data packet information from received generic data packets. Transmit interface 250 provides the data packet information and data packets to transmit block 252. Transmit block 252 examines the state of the communication link and determines whether to drop or transmit a data packet. If a data packet is to be transmitted, transmit block 252 appends packet delineation symbols and communicates the data packet to transmit link 254. Transmit link 254 encodes the data packet according to the communication protocol.

Transmitting control unit 164 also communicates with receiving control unit 102 to establish a communication link for data packet transmission. Transmitting control unit 164 also provides flow control operations and informs paddle card 52 when to initiate data packet transmission.

FIG. 11 is a block diagram illustrating one example of transmit interface 250 of FIG. 10. Transmit interface 250 includes an input register 260, an interface controller 262, an input buffer 264, a padding inserter 266, a CRC inserter 268, and an output controller 270. Input register 260 receives data packets from queues 162. Interface controller 262 manages the flow of data packets into input buffer 264. Input controller 262 may control the flow of data packets such that the input buffer 264 is maximized in order to optimize efficiency. Padding inserter 266 inserts padding or cell bytes into the data packet stream, and CRC inserter 268 inserts CRC sequences into the data packet stream. For example, CRC inserter 268 may insert an InfiniBand CRC according to an InfiniBand protocol. Output controller 270 controls the flow of data packets to paddle card 52.

FIG. 12 is a block diagram illustrating one example of transmit block 252 of FIG. 10. Transmit block 252 includes a link training command buffer 280, transmit link training state machines 282, a data state machine 283, and a flow control unit 286. Transmit link training state machine 282 include protocol state machines 284 that establish link synchronization according to the communication protocol of paddle card 52. A protocol state machine 284 receives instructions sent from receiving control unit 102 through link training command buffer 280. Data state machine 283 maintains the data packet stream after the communication link is established by inserting packet information or idle data into the data packet stream. If a data packet is to be transmitted, data state machine 283 checks the state of the communication link. If the communication link is operable to accept data packets, the data packet is transmitted. Otherwise, the data packet is dropped. Flow control unit 286 sends requests to data state machine 283 to send flow control information.

Figure 13:
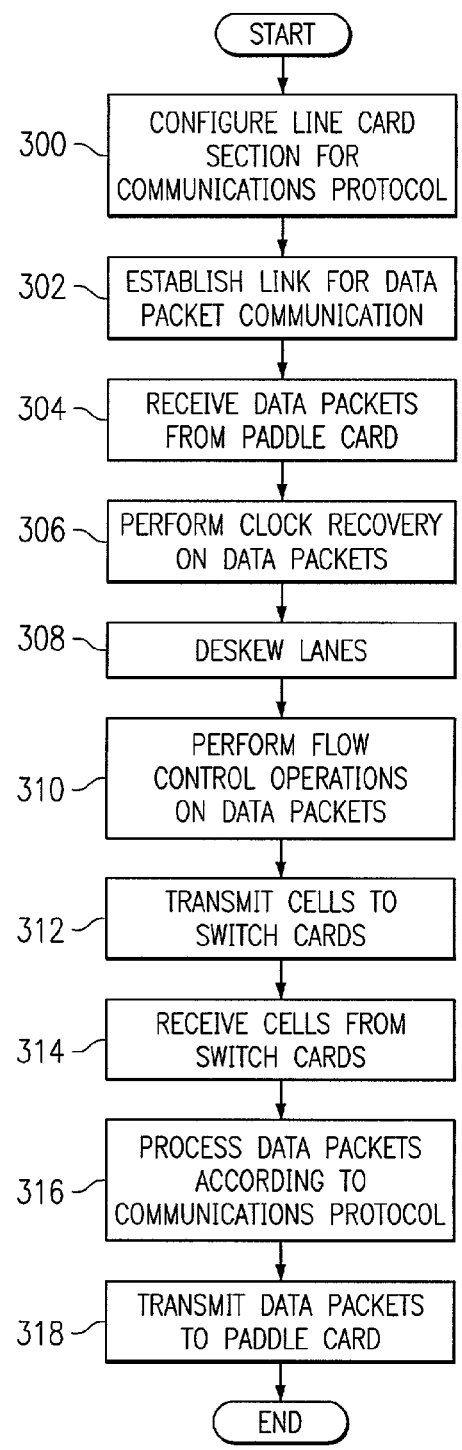
FIG. 13 is a flowchart illustrating one example of a method for communicating data packets.

FIG. 13 is a flowchart illustrating one example of a method for communicating data packets according to a communication protocol. The method communicates data packets from paddle card 52 to packet processor 76 and vice-versa according to a communication protocol associated with paddle card 52.

The method begins at step 300, where line card section 64 is configured for the communication protocol associated with paddle card 52. Receiving control unit 102 may configure line card section 64 by associating lanes with ports 100 and 166. A communication link for data packet communication is established at step 302. Receiving control unit 102 and transmitting control unit 164 may communicate with each other to establish the communication link. At step 304, data packets are received from paddle card 52.

At step 306, clock recovery is performed on the data packets. Receive link 200 may be used to perform the clock recovery. Lanes that are skewed are deskewed at step 308.

Deskew controller 218 of receive link 200 may adjust the flow of bytes of the data packets such that the bytes travelling on different lanes are synchronized.

At step 310, flow control operations are performed on the data packets. Flow controller 244 of receive interface 204 receives flow control information and may adjust the flow of data packets in response to the flow control information. Flow controller 244 may also instruct transmitting control unit 164 to adjust the flow of data packets to be transmitted to paddle card 52. The data packets are converted to cells, which are transmitted to switch card 58 at step 312.

At step 314, cells are received from switch cards and converted to data packets. The data packets are processed according to the communication protocol at step 316. Transmitting control unit 164 may be used to process the data packets. Data packets are transmitted to paddle card 52 at step 318. After transmitting the data packets to switch cards 58, the method is terminated.

Forwarding System

Figure 14:
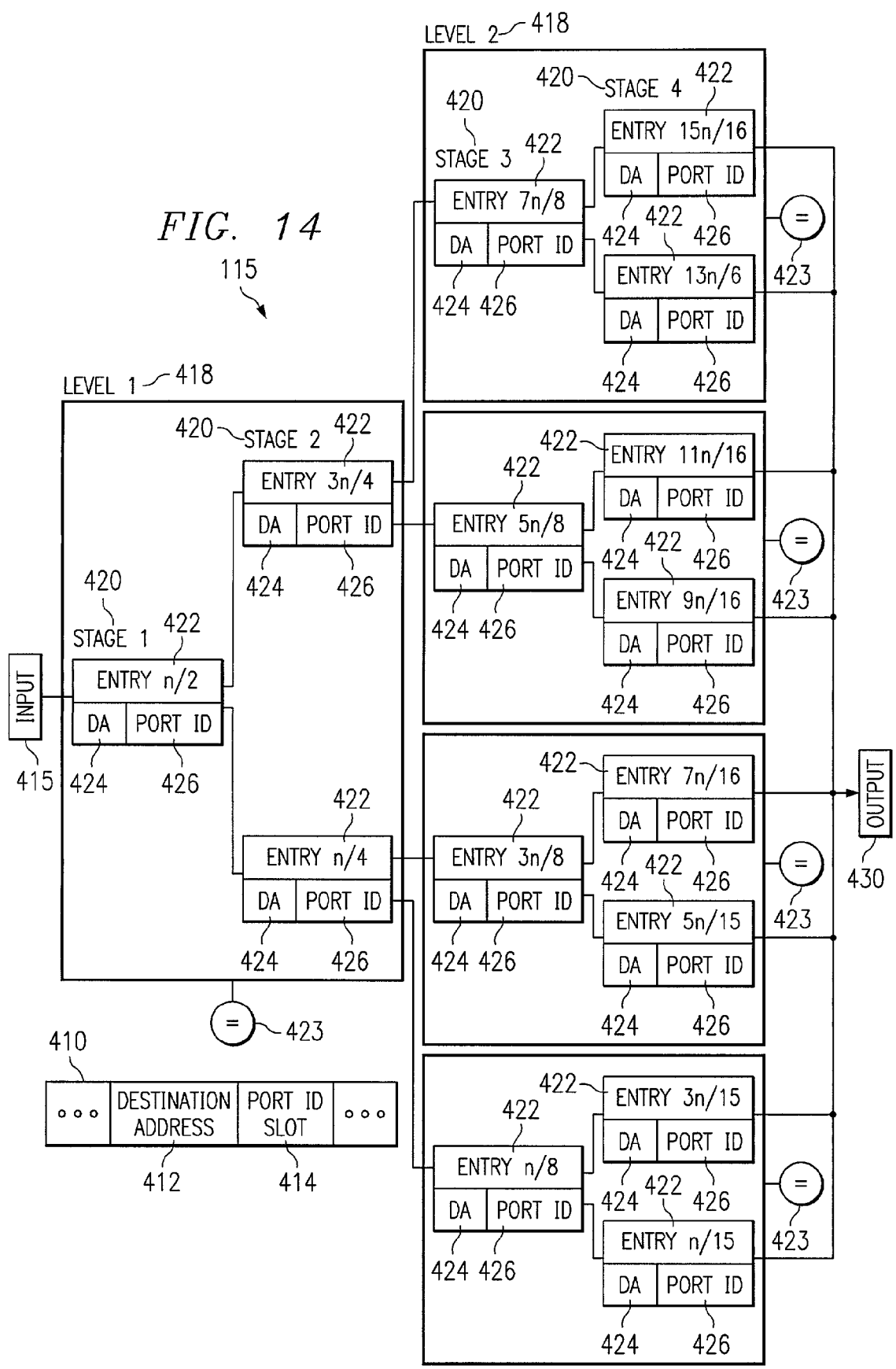
FIG. 14 is a block diagram illustrating one example of a forwarding system for forwarding a data packet.

FIG. 14 is a block diagram illustrating one example of a forwarding system 115 for forwarding a data packet 410. Data packet 410 includes a packet destination address 412 and a port identifier slot 414. Forwarding system 115 assigns a port identifier to data packet 410 in accordance with packet destination address 412. The assigned port identifier may be inserted into port identifier slot 414 of data packet 410.

Forwarding system 115 comprises an input 415, one or more levels 418 comprising one or more stages 420, and an output 430. In the illustrated example, levels 418 are labeled level 1 and level 2, and stages 420 are labeled stage 1 through stage 4. Forwarding system 115 may include any number n of entries 422. A stage 420 may include one or more entries 422. An entry 422 comprises an entry destination address 424 and a corresponding port identifier 426. If entry destination address 424 matches packet destination address 412, the corresponding port identifier 426 is assigned to data packet 410. A comparator 423 associated with level 418 may compare packet destination address 412 with entry destination address 424 to determine whether packet destination address 412 matches entry destination address 424.

Entries 422 may be ordered in a sequence from a lesser entry 422 to a greater entry 422 according to the destination addresses 424 of entries 422. For example, entry 422 with the smallest entry destination address 424 is the first entry, and entry 422 with the largest entry destination address 424 is entry n. An example of a sequence of entries 422 is described in more detail reference to FIGS. 15A and 15B.

Entries 422 may be arranged in a tree format, for example, a binary tree format. In the illustrated example, level 1 includes stages 1 and 2. Stage 1 includes entry n/2, where n represents the total number of entries in a sequence of entries in a sequence of entries. If n is an odd number, n/2 may be rounded accordingly. Entry n/2 is an approximate median of entries 1 through n. Stage 2 includes entries n/4 and 3n/4 coupled to entry 422a. A lower entry n/4 is an approximate median of entries 1 through n/2, and a higher entry 3n/4 is an approximate median of entries n/2 through n.

Level 2 includes stages 3 and 4. Stage 3 includes entries 5n/8 and 7n/8 coupled to entry 3n/4. A lower entry 5n/8 is an approximate median of entries n/2 through 3n/4. A higher entry 7n/8 is an approximate median of entries 3n/4 through n. Stage 3 also includes entries n/8 and 3n/8 coupled to entry n/4, with substantially similar relationships as entries 5n/8, 7n/8, and 3n/4, respectively. Entries 422 of stage 4 are arranged in a substantially similar manner. Output 430 outputs data packet 410 with a port identifier 426 assigned in accordance with packed destination address 412.

Although a binary tree is illustrated, any suitable configuration of levels 418, stages 420, and entries 422 may be used. For example, a level 418 may include any number of stages 420, and a stage 420 may include any number of entries 422. Moreover, different levels 418 may include different numbers of stages 420, and different stages 420 may include different numbers of entries 422.

According to one embodiment, forwarding system 115 provides for forwarding data packet 410. Data packet 410 enters level 1. Packet destination address 412 is compared with entry destination addresses 424 of level 1. If packet destination address 412 matches an entry destination address 424, data packet 410 is assigned the port identifier 426 of the matching entry destination address 424. Otherwise, data packet 410 is transmitted to level 2 in accordance with the comparison between packet destination address 412 and entry destination address 424. While level 2 is processing data packet 410, level 1 is available to process a next data packet 410, which may allow forwarding system to efficiently process multiple data packets 410. A method for forwarding data packet 410 is described in more detail with reference to FIG. 18.

Figure 15A:
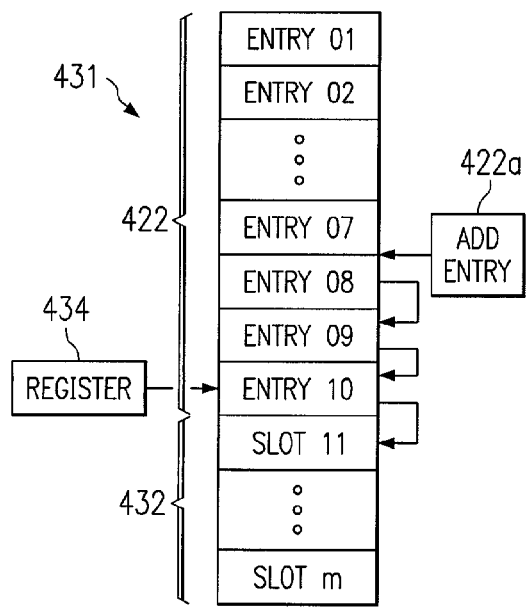
FIG. 15A illustrates one example of adding an entry to a sequence of entries.

FIG. 15A illustrates one example of adding an entry 422 to a sequence 431 of entries 422 recorded in slots 1, . . . , i, . . . ,m. A packet processor 76 that first receives data packet 410 with a new destination address may instruct other packet processors 76 to add the destination address to their own forwarding systems 115. Entries 422 are ordered in accordance with their entry destination addresses 424. Slots 432 comprise memory where entries 422 may be stored. A register 434 records the number n of entries 422. To add an entry 422a, the position of entry 422a within sequence 431 is determined according to the entry destination address 424 of entry 422a. A last entry 422 is determined from register 434. In the illustrated example, the last entry is entry 10. Last entry 422 is shifted to an adjacent slot in the +i direction, which in the illustrated example is slot 11. Entries 422 between the position where added entry 422a is to be added are shifted in the +i direction. Entry 422a is then added to the sequence of entries 422.

Figure 15B:
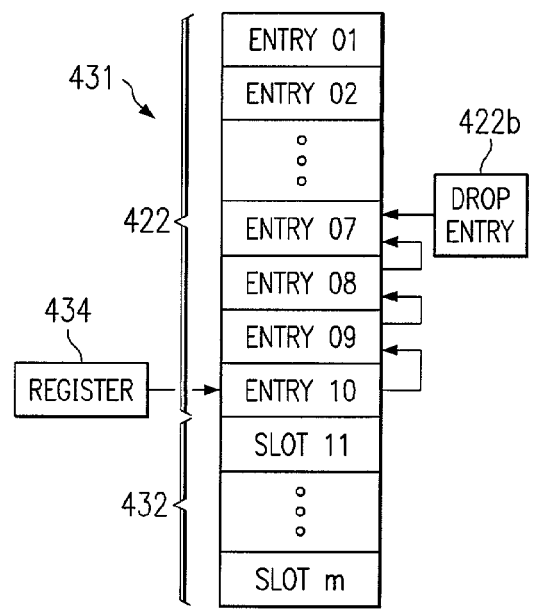
FIG. 15B illustrates one example of dropping an entry from a sequence of entries.

FIG. 15B illustrates one example of dropping an entry 422b from sequence 431 of entries 422. A packet processor 76 that first receives data packet 410 with a new destination address may track the length of time the destination address is stored in forwarding system 115. After a period of time, packet processor 76 may delete, or drop, the destination address, and may instruct other packet processors 76 to drop the destination address. Entry 422b to be dropped is located in sequence 431 of entries 422. Entry 422b is dropped, and entries 422 between dropped entry 422b and slots 432 are shifted in the −i direction.

Figure 16:
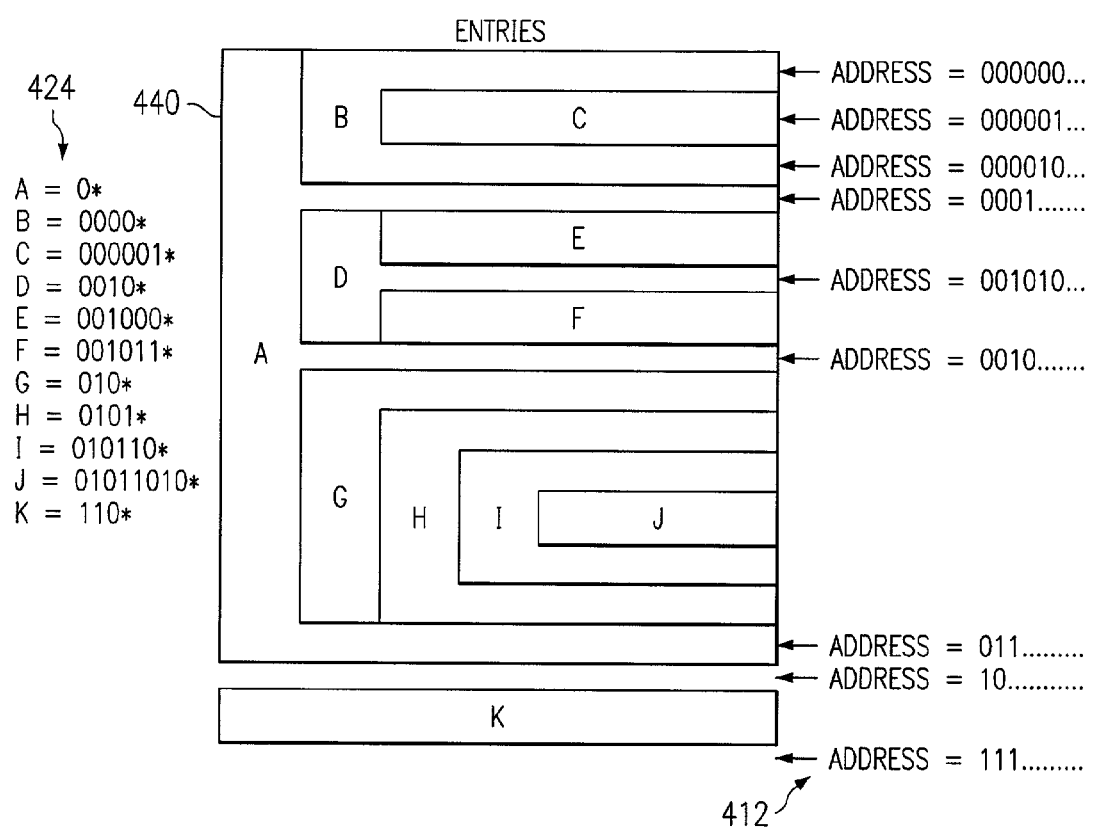
FIG. 16 illustrates an arrangement of example entry destination addresses.

FIG. 16 illustrates an arrangement 440 of example entry destination addresses 424. Forwarding system 115 may be used to find an entry destination address 424 with a longest matching prefix with packet destination address 412, if an exact match is not required. Packet destination address 412 may be accompanied by mask bits that indicate one or more significant bits are unmasked bits that must be matched, and one or more less significant bits are masked bits that do not need to be matched.

In one example, a technique may be used to reduce the storage space needed for a separate series of mask bits. According to the technique, the most significant bit that is to be masked is replaced with a 1, and the less significant bits are replaced with 0's. In standard binary notation, the bits to the left of the right-most 1 bit are unmasked, and the bits to the right of and including the right-most 1 bit are masked. An additional bit may be used if the most significant bit is 0. The additional bit may be used to store the right-most 1.

Arrangement 440 includes entry destination addresses 424 A through K. An asterisk represents masked bits, or bits that do not need to be matched. For example, destination address A=0* may represent destination addresses 0000*, 0001010*, or 000001*. A destination address that may be represented by another destination address is shown as nested in arrangement 440. For example, destination address B=0000* may be represented by destination address A=0*. Destination addresses with no nested destination addresses may be referred to as "singletons". For example, destination addresses C, E, F, J, and K are singletons. Destination addresses that include other nested destination addresses may be referred to as "doubletons". For example, destination addresses A, B, D, G, H, and I are doubletons. Packet destination addresses 412 may be matched to entry destination addresses 424. For example, packet destination address 000001 . . . may be matched to entry destination address B=0000*.

Figure 17:
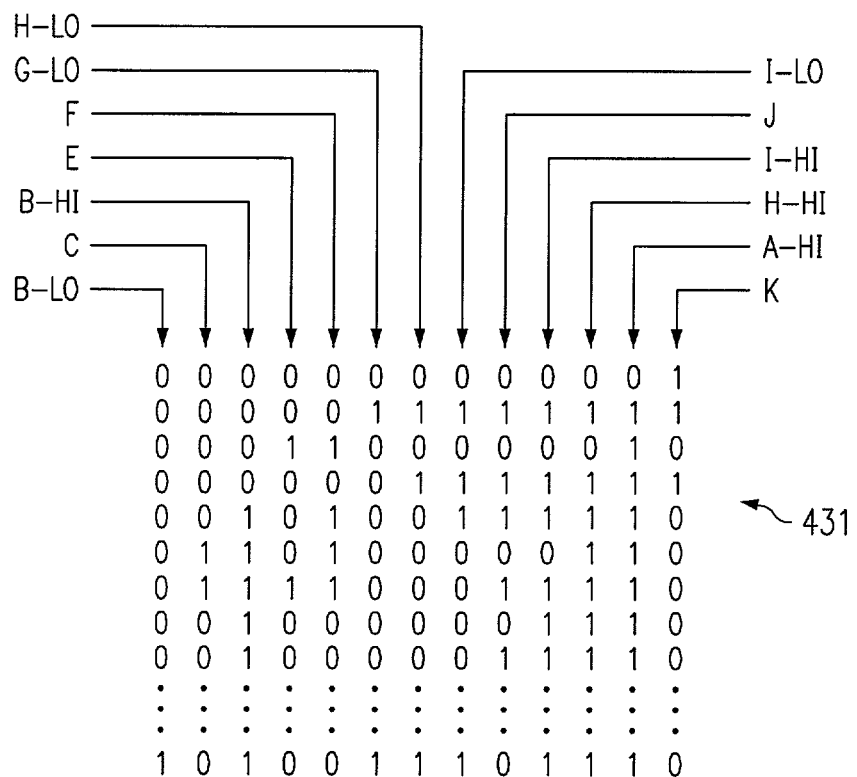
FIG. 17 illustrates one example of the entry destination addresses of FIG. 16 arranged as a sequence of entries.

FIG. 17 illustrates one example of entry destination addresses 424 of FIG. 16 arranged as a sequence 431 1, . . . ,i, . . . n of entries 422. Singletons C, E, F, J, and K are entered as the singleton followed by 0's. For example, C=000001* is entered as 000001000 . . . 0. Doubletons A, B, D, G, H, and I are entered as a high value representing the maximum value of the doubleton and as a low value representing the minimum value of the doubleton. For example, B=0000* is entered as a high value 0000111 . . . 1 and as a low value 0000000 . . . 0. If a high value or a low value is superceded, the value will not appear in sequence 431. For example, a low value of A=0* is 0000 . . . 0, which is superceded by the low value for B, and thus the low value of A does not appear in sequence 431.

The order of entries 422 of sequence 431 provides for an efficient method of searching for a longest matching prefix. For example, if packet destination address 412 matches a doubleton, a longer prefix match, if any, occurs in the +i direction.

Figure 18:
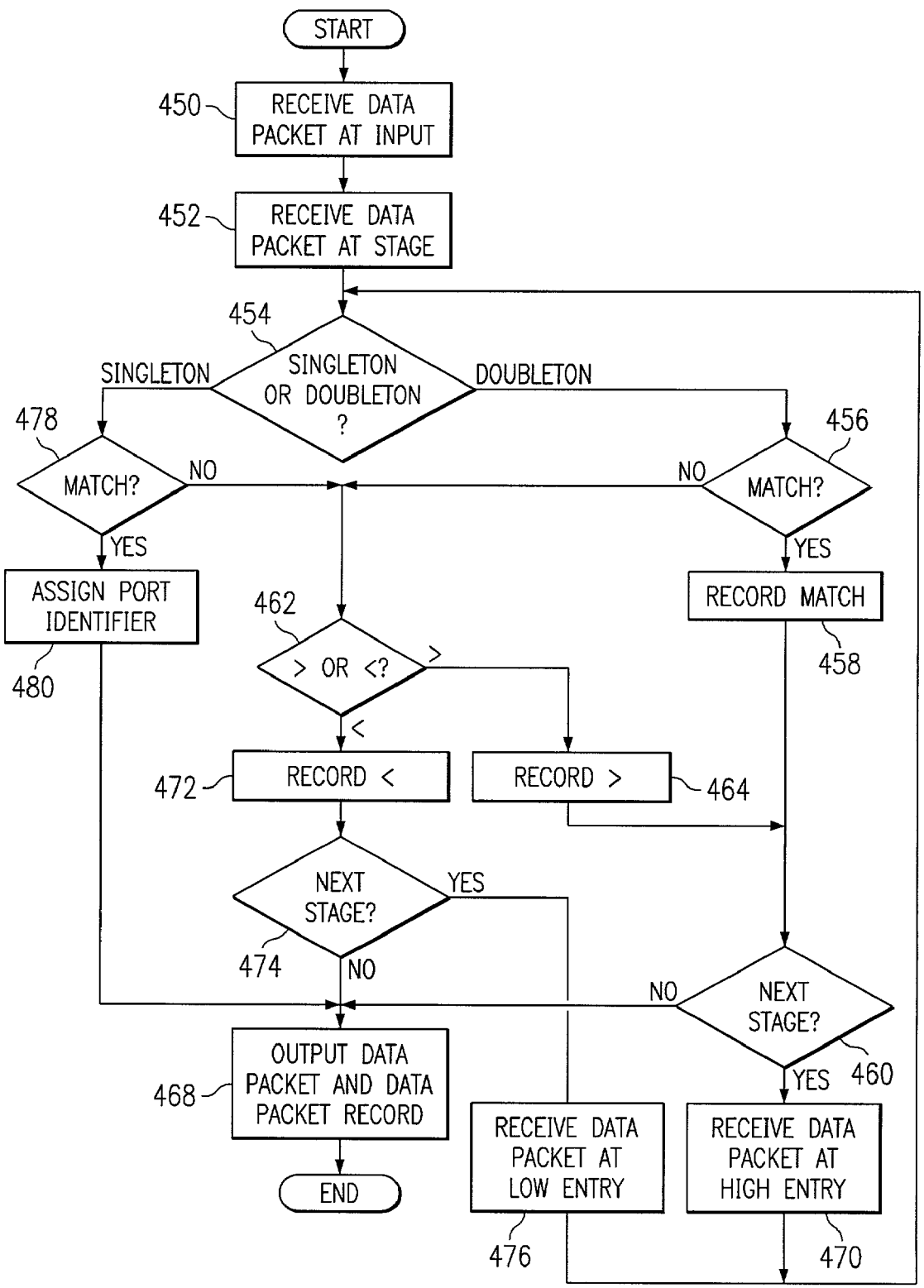
FIG. 18 is a flowchart illustrating one example of a method for forwarding a data packet.

FIG. 18 is a flowchart illustrating one example of a method for forwarding data packet 410. According to the method, forwarding system 115 assigns port identifier 426 to data packet 410 in accordance with packet destination address 412 of data packet 410.

The method begins at step 450, where forwarding system 115 receives data packet 410 at input 415. At step 452, a stage 420 receives data packet 210. In the illustrated example, stage 1 receives data packet 410. Forwarding system 115 determines at step 454 whether entry 422 is a singleton or a doubleton. If entry 422 is a doubleton, the method proceeds to step 456 to determine whether packet destination address 412 matches entry destination address 424. If there is a match, the match is recorded in a record for data packet 410 at step 458, and the method proceeds to step 460 to determine whether there is a next stage.

If there is no next stage, the method proceeds to step 468 to output data packet 410 and the record of data packet 410, which records the relationship between packet destination address 412 and entry destination address 422. Port identifier 424 associated with recorded entry destination address 422 may be assigned to data packet if the recorded relationship satisfies a matching criteria such as the unmasked portions of packet destination address 412 and entry destination address 422 match. After outputting data packet 410 and data packet record, the method terminates. If there is a next stage, the method proceeds to step 470 to receive the data packet at a higher entry. As described with reference to FIG. 17, if an entry 422 matches a doubleton, a longer prefix match, if any, occurs at an entry 422 even higher than where the entry was received. The method then returns to step 454 to determine whether the higher entry 422 where the entry was received is a singleton or a doubleton.

If there is no match at step 456, the method proceeds to step 462 to determine whether packet destination address 412 satisfies a high criteria or a low criteria, for example, is greater than or less than entry destination address 424. If packet destination address 412 is greater than entry destination address 422, the relationship is recorded in a record for data packet 410 at step 464, and the method proceeds to step 460 to determine whether there is a next stage.

If packet destination address 412 is a less than destination address 424 at step 462, the relationship is recorded at step 472. At step 474, the method determines whether there is a next stage. If there is no next stage, the method proceeds to step 468 to output data packet 410 and the record for data packet 410. If there is a next stage, the method proceeds to step 476 to receive data packet 410 at a lower entry 422. The method then proceeds to step 454 to determine whether lower entry 422 is a singleton or doubleton.

If an entry 422 is a singleton at step 454, the method proceeds to step 478 to determine whether packet destination address 412 matches entry destination address 424. If there is a match, the method proceeds to step 480 to assign port identifier 426 to data packet 410, and the method terminates. If there is no match, the method proceeds to step 462 to determine whether packet destination address 412 is greater than or less than entry destination address 422.

Figure 19:
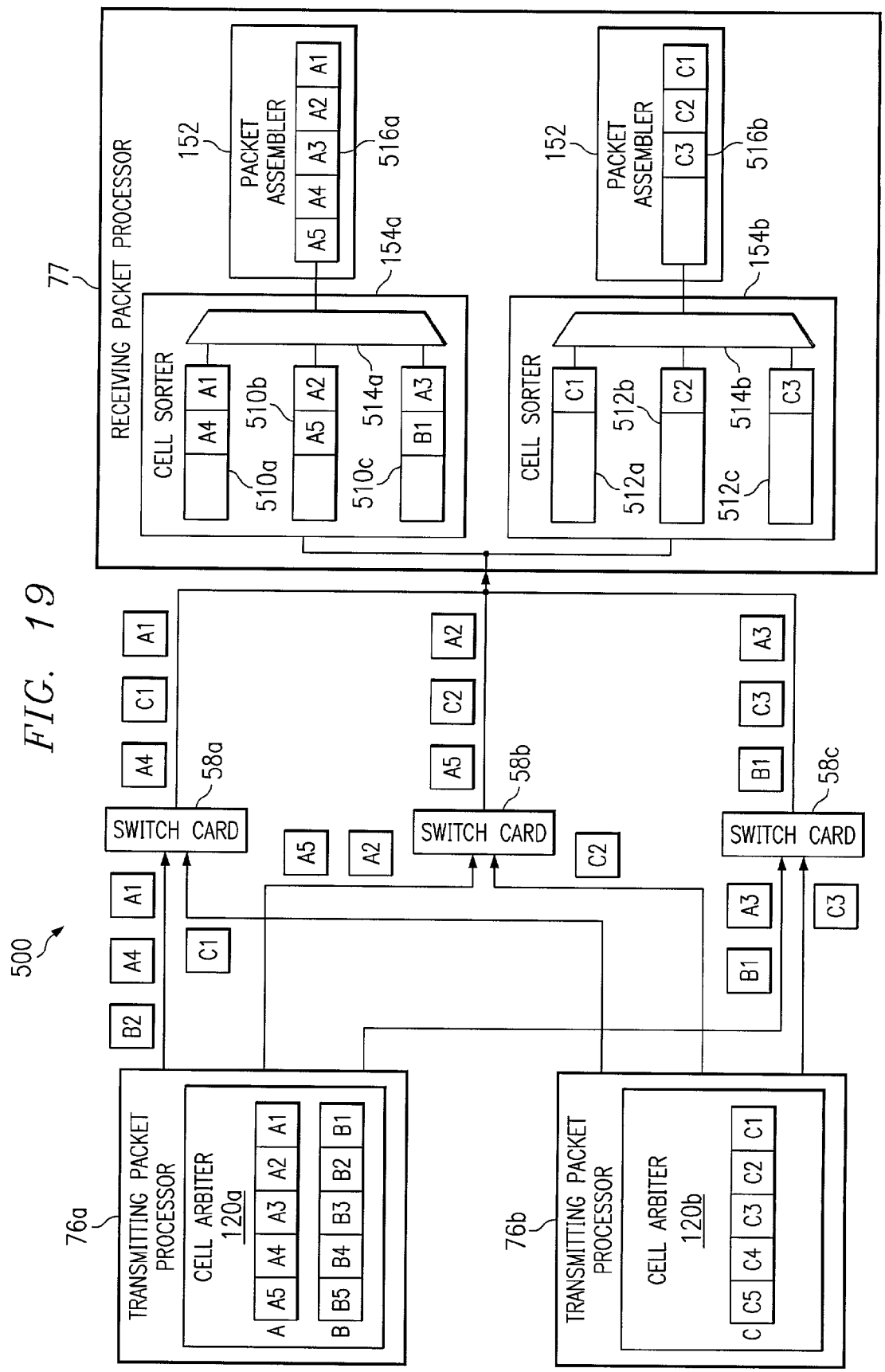
FIG. 19 is a block diagram illustrating one example of a system for transmitting data packets from one or more transmitting packet processors through one or more switch cards to one or more receiving packet processors.

FIG. 19 is a block diagram illustrating one example of a system 500 for transmitting data packets from one or more transmitting packet processors 76 through one or more switch cards 58 to one or more receiving packet processors 77. Transmitting packet processors 76 divide data packets into cells and transmit the cells to switch cards 58. Receiving packet processors 77 receive the cells from switch cards 58 and reassemble the cells back into the data packets.

In the illustrated example, system 500 includes transmitting packet processors 76 and receiving packet processor 77, which are described in more detail with reference to FIG. 4. Transmitting packet processors 76 include cell arbiters 120, which divide data packets into cells. For example, cell arbiter 120a divides data packet A into cells labeled A1, A2, . . . , A5, and divides data packet B into cells labeled B1, B2, . . . , B5. Cell arbiter 120b divides data packet C into cells labeled C1, C2, . . . . C5.

Cell arbiters 120 distribute cells to a sequence of switch cards 58. Cell arbiters 120 may, for example, distribute cells in a round robin manner. Cell arbiter 120a may distribute a first cell A1 to switch card 58a, a next cell A2 to switch card 58b, a next cell A3 to switch card 58c, and so on, and a last cell A5 to switch card 58b. To distribute a next data packet B, cell arbiter 120a may transmit a first cell B1 to the next switch card 58c. The next switch card 58c may be the next switch card 58 in the sequence of switch cards 58. To continue transmitting data packet B, cell arbiter 120a sends the next cell B2 to switch card 58a, and so on. Similarly, cell arbiter 120b sends a first cell C1 of data packet C to switch card 58a, a next cell C2 to switch card 58b, and so on.

Any suitable manner of distributing the cells, however, may be used. For example, cell arbiter 120 may send a first cell to a specific switch card 58 instead of to a next switch card. Cell arbiter 120a may send the first cells to switch card 58a. For example, cell arbiter 120a sends first cell B1 of packet B to switch card 58a instead of to switch card 58c. In addition, cell arbiter 120 may skip a switch card 58 if, for example, switch card 58 is defective and cannot route cells.

Transmitting packet processor 76 may assign a cell identifier to a cell. The cell identifier of a cell may describe the data packet from which the cell originated, the position of the cell within the data packet, and the length of the data packet. For example, a cell identifier of cell A1 may identify the cell as the first cell, or head cell, of data packet A. Similarly, a cell identifier of cell A5 may identify the cell as the last cell, or tail cell, of data packet A. Transmitting packet processor 76 may also insert routing instructions in a cell that are used to direct the cell to a switch card 58 and then to a receiving packet processor 77. Additionally, transmitting packet processor may receive flow control information from switch cards 58 and adjust the flow of cells in response to the flow control information.

Receiving packet processor 77 includes cell sorters 154 and packet assemblers 152. Cell sorters 154 organize cells received from switch cards 58 and send the cells to packet assemblers 152, which assemble the cells into data packets. A cell sorter 154 may receive cells transmitted from an associated transmitting packet processor 76. For example, cell sorter 154a receives cells from transmitting packet processor 76a, and cell sorter 154b receives cells from transmitting packet processor 76b.

Cell sorter 154 includes cell queues 510 and a sorter 514. Cell queues 510 may comprise first-in, first-out buffers. A cell queue 510 may receive cells from a specific switch card 58. For example, cell queue 510a receives cells from switch card 58a. Sorter 514 selects cells from cell queues 510 and places the cells in packet assembly queue 514 of packet assembler 152 in order to generate a data packet from the cells.

Sorter 514 may predict an expected cell identifier for a cell in a cell queue 510. For example, sorter 514 may predict that cell A1 from data packet A should be in cell queue 510a. Sorter 514 may verify whether the cell in cell queue 510a has the appropriate cell identifier. If the cell identifier of the cell in cell queue 510 does not match the expected cell identifier, sorter 514 may mark the resulting data packet as corrupted. For example, if cell A1 has been dropped during transmission from transmitting packet processor 76a to receiving packet processor 77, and cell A4 shows up as the first cell in cell queue 510a, sorter 514 may mark the resulting data packet as a corrupted.

Figure 20:
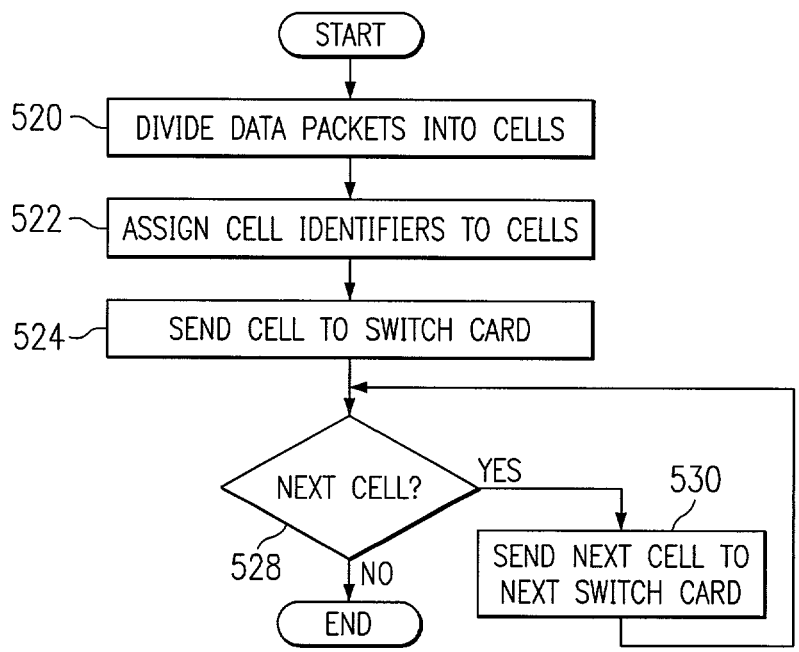
FIG. 20 is a flowchart illustrating one example of a method for distributing data packets from transmitting packet processor to switch cards.

FIG. 20 is a flowchart illustrating one example of a method for distributing data packets from transmitting packet processor 76 to switch cards 58. The method begins at step 520, where cell arbiter 120 divides data packets into cells. For example, cell arbiter 120a divides data packet A into cells labeled A1, A2, . . . , A5. Cell identifiers are assigned to cells at step 522. The cell identifier may identify the data packet from which the cell originated and the position of the cell within the data packet. A cell identifier may also identify a switch card 58 through which the data packet is transmitted. A cell identifier for a first cell of a data packet may also include the length of the data packet.

The cell is sent to a switch card 58 at step 524. At step 528, cell arbiter 120 determines whether there is a next cell to be sent to switch card 58. If there is a next cell, the method proceeds to step 530, where cell arbiter 120 sends the next cell to a next switch card 58. The next switch card may be, for example, the next switch card in the sequence of switch cards 58. The method then returns to step 528 to determine whether there is a next cell to send to switch cards 58. If there is no next cell, the method is terminated.

Figure 21:
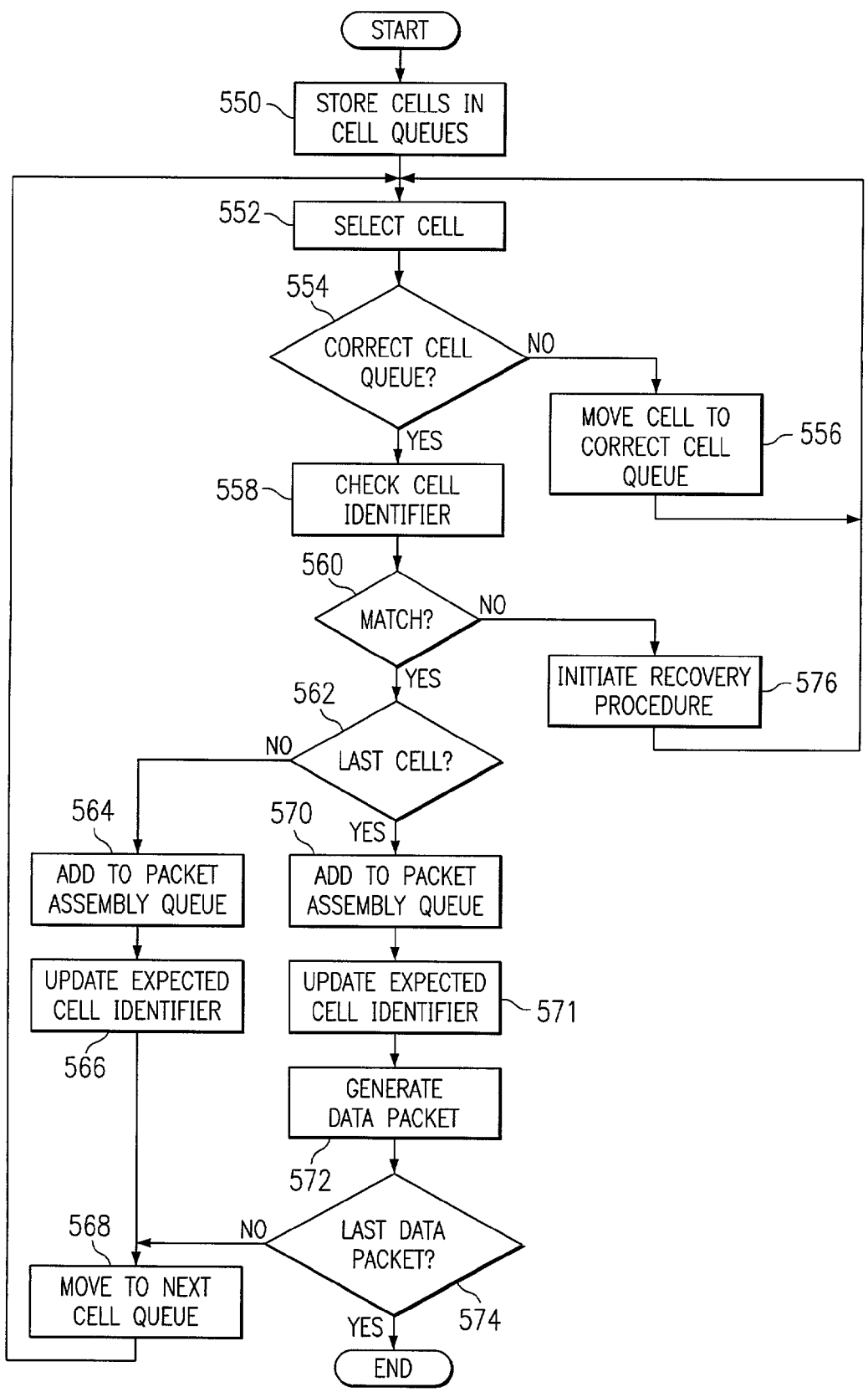
FIG. 21 is a flowchart illustrating one example of a method for assembling cells into a data packet at receiving packet processor.

FIG. 21 is a flowchart illustrating one embodiment of a method for assembling cells into a data packet at receiving packet processor 77. The method begins at step 550, where cell sorters 154 store cells in cell queues 510 and 512. Cell sorter 154a may store cells received from transmitting packet processor 76a, and cell sorter 154b may store cells received from transmitting packet processor 76b. Cell queues 510a, 510b, and 510c may store cells received from switch cards 58a, 58b, and 58c, respectively. Similarly, cell queues 512a, 512b, and 512c may store cells received from switch cards 58a, 58b, and 58c, respectively.

Cell sorter 154 selects the cell from cell queue 510 or 512 at step 552. In the illustrated example, a cell from cell queue 510a is selected. Cell sorter 154 determines whether the detected cell is in the correct cell queue 510a at step 554. If the cell is not in the correct cell queue 510a, the method proceeds to step 556, where cell sorter 154 moves the cell to the correct cell queue 510. The method then returns to step 552, where cell sorter 154 selects the next cell from cell queue 510a.

If the cell is in the correct cell queue 510a at step 554, the method proceeds to step 558, where sorter 514 checks the cell identifier of the selected cell. Sorter 514 may predict an expected cell identifier of a cell that is to appear in a cell queue 510a. For example, sorter 514 may predict that a first cell A1 of data packet A will appear in cell queue 510a. Sorter 514 may check whether the cell identifier of the cell in cell queue 510a matches the expected cell identifier at step 560. If the cell is the first cell of a data packet, sorter 514 may also check the cell identifier to determine the length of the data packet.

If the cell identifier matches the expected cell identifier at step 560, the method proceeds to step 562, where sorter 514 determines whether the cell is a last cell of a data packet. The cell identifier may identify the cell as a tail cell. Sorter 514 may also track the length of the data packet to determine the last cell. If the cell is not a last cell at step 562, the method proceeds to step 564 to add the cell to packet assembly queue 516 of packet assembler 152.

The expected cell identifier is updated at step 566. For example, if a first cell A1 of data packet A appeared in cell queue 510a, then the expected cell identifier is updated to predict the next cell A2 of data packet A in cell queue 510b. Sorter 514 moves to the next cell queue 510b at step 568, and the method returns to step 552, where a cell from the next cell queue 510b is selected.

If the cell is a last cell at step 562, the method proceeds to step 570, where the cell is added to packet assembly queue 516. The expected cell identifier is updated at step 571. If the cell is a last cell, the cell identifier may be updated to predict a first cell of a next data packet. Packet assembler 152 generates a data packet from the cells stored in a packet assembly queue 516 at step 572. At step 574, cell sorter 154 determines whether the generated data packet is the last data packet. If the generated data packet is not the last data packet, the method returns to step 568, where cell sorter 154 moves to the next cell queue 510b. If the generated data packet is the last data packet, the method terminates.

If at step 560, sorter 514 determines that the cell identifier of the cell in cell queue 510a does not match the expected cell identifier, the method proceeds to step 576 to initiate a recovery procedure. An example of a recovery procedure is described with respect to FIG. 22. The method returns to step 552, where sorter 514 selects the cell of the next cell queue 510b.

FIG. 22 is a flowchart illustrating one embodiment of a recovery procedure. The method begins at step 602, where sorter 514 determines that a cell identifier of a cell in cell queue 510 does not match an expected cell identifier. Sorter 514 determines whether the cell identifier of the cell is less than or greater than the expected cell identifier at step 604. A cell identifier of a cell that is less than an expected cell identifier indicates that the cell was sent prior to the expected cell. A cell identifier of a cell that is greater than an expected cell identifier indicates that the cell was sent after the expected cell.

If there is a finite range of cell identifiers such that values of the cell identifiers are reused, a cell with a cell identifier having a larger value does not necessarily mean that the cell arrived after a cell with a cell identifier having a smaller value. The following technique may be used to determine if a cell identifier A is greater than or less than an expected cell identifier B, given a finite range R of cell identifiers:

If A>B, then:

$$X=A-B$$

$$Y=R+B-A$$

else:

$$X=R+A-B$$

$$Y=B-A$$

if A B, then A equals B;
else if X<Y, then A is greater than B;
else A is less than B.

The technique may be also be executed using the following example procedure. Variables A, B, and D represent numbers, for example, 10-bit binary numbers. Variable D represents distance, and is defined as the difference between B and A, that is, (B–A), which may be calculated using simple binary subtraction. If D is a simple 10-bit binary number, D represents positive values. Accordingly, if A is greater than B, then the difference D will be equal to the value $(2^{10}+B-A)$. For example, if B=10 and A=900, then $D=B-A=2^{10}+B-A=134$, that is, the distance D from A to B is 134.

In the example, the most significant bit of D indicates whether the distance from A to B is greater than or less than 512 on a round scale. If the most significant bit of D is 1, the distance from A to B is greater than 512, and B is less than A on a round compare. If the most significant bit of D is 0, the distance from A to B is less than 512, and A is less than B on a round compare. If the difference between A and B is 0, then A equals B.

In one example, the following description, written in VERILOG, may be used to implement the procedure:

```
module CompareRound10(
//Outputs
lessThan, equal, greaterThan,
// Inputs
a, b
);
input [9:0] a;
input [9:0] b;
output lessThan;
output equal;
output greaterThan;
// compute the distance from A to B
wire [9:0] difference=b-a;
// does A equal B exactly
assign equal=(difference ==0);
// if (A !=B) and (difference[9]=0) (i.e., Distance is 1 to
    511) then the
```

// distance from A to is less than 512 hence A is less than B in a round compare
assign lessThan=~equal & ~difference[9];
// if difference[9] 1 (i.e., Distance is 512–1023) then the distance from A to B
// is greater than 512 hence A is greater then B in a round compare assign greaterThan=difference[9];
endmodule If the cell identifier is less than the expected cell identifier, the method proceeds to step 606. The assumption is that the cell is corrupted and was sent to cell queue 510 by mistake. At step 606, the cell is discarded. Sorter 514 stays at cell queue 510 at step 608. The expected cell identifier is maintained at 610. After maintaining the expected cell identifier, the method terminates.

If the cell identifier of the cell is greater than the expected cell identifier at step 604, the method proceeds to step 612, where sorter 514 determines whether the path length of the data packet is known. The data packet length may be known if sorter 514 has already received a first cell of the data packet that includes the packet length of the data packet. If the packet length is known, the method proceeds to step 614. The assumption is that the current data packet is missing a cell and is therefore corrupted. At step 614, sorter 514 leaves the cell in cell queue 510 and marks the current contents of packet assembly queue 516 as corrupted. If the expected cell is the last cell of a data packet, sorter 514 transmits the contents. Sorter 514 moves to the next cell queue 510 at step 616. The expected cell identifier is updated at step 618. If the expected cell is a middle cell of a data packet, the expected cell identifier may be updated to the next cell of the data packet. If the expected cell is a last cell of a data packet, the expected cell identifier may be updated to a first cell of a next data packet. After updating the expected cell identifier, the method terminates.

If the packet length is not known at step 612, the method proceeds to step 620. If the expected cell is a first cell at step 620, the method proceeds to step 622. The assumption is that the first cell of the current data packet is lost and thus the data packet is corrupted. The received cell may be, for example, the first cell of a different data packet, a middle cell, or a last cell. At step 624, sorter 514 leaves the cell in cell queue 510. The data packet is marked as corrupted. Sorter 514 moves to the next cell queue 510 at step 526. The expected cell identifier is updated at step 628 to expect the next cell of the data packet. After updating the expected cell identifier, the method terminates.

If the expected cell is a middle cell at step 620, the method proceeds to step 630. Sorter 514 determines the type of received cell at step 632. If the received cell is a first cell, the method proceeds to step 634. The assumption is that the current data packet is missing a cell and therefore is corrupted, and the received first cell is the beginning of a potentially uncorrupted data packet. The contents of packet assembly queue 516 are marked as corrupted and transmitted. The received cell is added to packet assembly queue 510 at step 636. Sorter 514 moves to the next cell queue 510 at step 638. The expected cell identifier is updated at step 640 to expect the second cell of the packet. After updating the expected cell identifier, the method terminates.

If the received cell is a single cell at step 632, the method proceeds to step 642. The assumption is that the current data packet is missing a cell and therefore corrupted, so the contents of packet assembly queue 516 are marked as corrupted and transmitted. The received cell is discarded at step 644. Alternatively, the received cell may be transmitted instead of discarded. Sorter 514 moves to the next cell queue 510 at step 646. The expected cell identifier is updated at step 648 to expect the first cell of the next data packet. After updating the expected cell identifier, the method terminates.

If the received cell is a middle or last cell at step 632, the method proceeds to step 650. The assumption is the current data packet is missing a cell and therefore corrupted, so cells are added to packet assembly queue 516 until a first cell is received to start a potentially uncorrupted data packet. At step 652, the received cell is added to packet assembly queue 516. Sorter 514 moves to the next cell queue 510 at step 654. The expected cell identifier is updated at step 656. If the received cell is a last cell, the expected cell identifier may be updated to expect a first cell of a next data packet. After updating the expected cell identifier, the method terminates.

Certain embodiments of the invention may provide numerous technical advantages. A technical advantage of one example is that a system may reconfigure itself to support any of a number of communication protocols. A line card section receives a paddle card that supports a specific communication protocol. The line card section identifies the communication protocol and reconfigures itself to support the communication protocol. Consequently, the system may support any of a number of communication protocols, which may provide more effective data storage.

Although an embodiment of the invention and its advantages are described in detail, a person skilled in the art could make various alterations, additions, and omissions without departing from the spirit and scope of the present invention as defined by the appended claims.

What is claimed is:

1. A system for processing a data packet, comprising:
a paddle card slot operable to:
receive a first paddle card operable to support a first communication protocol; and
receive a second paddle card operable to support a second communication protocol; and
a packet processor coupled to the paddle card slot and operable to:
determine whether a received paddle card comprises the first paddle card or the second paddle card;
identify the communication protocol supported by the received paddle card;
receive a plurality of data packets from the received paddle card;
process the data packets according to the identified communication protocol; and
transmit the data packets to a switch card:
wherein the received paddle card comprises a plurality of lanes operable to communicate the date packets and the packet processor comprises a receiving control unit comprising a plurality of ports and operable to associate the lanes with the ports in response to the identified communication protocol.

2. The system of claim 1, wherein the packet processor is operable to:
receive a plurality of data packets from the switch card;
process the data packets according to the Identified communication protocol; and
transmit the data packets to the received paddle card.

3. The system of claim 1, wherein the packet processor comprises a receiving control unit operable to establish a link operable to communicate the data packets according to the identified communication protocol.

4. The system of claim 1, wherein the packet processor comprises a receiving control unit comprising:

a first protocol state machine operable to establish a link operable to support the first communication protocol; and a second protocol state machine operable to establish a link operable to support the second communication protocol, the receiving control unit operable to select the first protocol state machine or the second protocol state machine to establish a link operable to support the identified communication protocol.

5. The system of claim 1, wherein the packet processor comprises a forwarding system comprising a first level and a second level, the first level operable to:

compare a packet destination address of a first data packet to an entry destination address;

assign a port identifier if the packet destination address matches the entry destination address;

transmit the data packet to an entry of the second level in response to the comparison; and process a second data packet substantially when the second level processes the first data packet.

6. A method for processing a data packet, comprising:

receiving a paddle card comprising a first paddle card operable to support a first communication protocol or a second paddle card operable to support a second communication protocol;

identifying the communication protocol supported by the receiving paddle card;

receiving a plurality of data packets from the received paddle card;

processing the date packets according to the identified communication protocol;

transmitting the data packets to a switch card; and associating a plurality of lanes with a plurality of ports in response to the identified communication protocol, wherein the lanes are coupled to the received paddle card and the ports are operable to receive the data packets from the lanes.

7. The method of claim 6, further comprising:

receiving a plurality of data packets from the switch card;

processing the data packets according to the identified communication protocol; and transmitting the data packets to the received paddle card.

8. The method of claim 6, further comprising establishing a link operable to communicate the data packets according to the identified communication protocol.

9. The method of claim 6, further comprising selecting a first protocol state machine or a second protocol state machine to establish a link operable to support the identified communication protocol, the first protocol state machine operable to establish a link operable to support the first communication protocol, the second protocol state machine operable to establish a link operable to support the second communication protocol.

10. The method of claim 6, further comprising:

receiving a first data packet at a forwarding system comprising a first level and a second level;

at the first level, comparing a packet destination address of the first data packet to an entry destination address;

assigning a port Identifier if the packet destination address matches the entry destination address;

transmitting the first data packet to an entry of the second level in response to the comparison; and processing a second data packet substantially when the second level processes the first data packet.

11. Logic for processing a data packet, the logic encoded in media and operable to:

receive a paddle card comprising a first paddle card operable to support a first communication protocol or a second paddle card operable to support a second communication protocol;

identify the communication protocol supported by the received paddle card;

receive a plurality of data packets from the received paddle card;

process the data packets according to the identified communication protocol;

transmit the data packets to a switch card; and associate a plurality of lanes with a plurality of ports in response to the identified communication protocol, wherein the lanes are coupled to the received paddle card and the ports are operable to receive the date packets from the lanes.

12. The logic of claim 11, further operable to:

receive a plurality of data packets from the switch card;

process the data packets according to the identified communication protocol; and transmit the data packets to the received paddle card.

13. The logic Of claim 11, further operable to establish a link operable to communicate the data packets according to the identified communication protocol.

14. The logic of claim 11, further operable to select a first protocol state machine or a second protocol state machine to establish a link operable to support the identified communication protocol, the first protocol state machine operable to establish a link operable to support the first communication protocol, the second protocol state machine operable to establish a link operable to support the second communication protocol.

15. The logic of claim 11, further operable to;

receive a first data packet at a forwarding system comprising a first level and a second level; and at the first level, compare a packet destination address of the first data packet to an entry destination address;

assign a port identifier if the packet destination address matches the entry destination address;

transmit the first data packet to an entry of the second level in response to the comparison; and process a second data packet substantially when the second level processes the first data packet.

16. A system for processing a data packet, comprising:

means for receiving a paddle card comprising a first paddle card operable to support a first communication protocol or a second paddle card operable to support a second communication protocol;

means for Identifying the communication protocol supported by the received paddle card;

means for receiving a plurality of data packets from the received paddle card;

means for processing the data packets according to the identified communication protocol;

means for transmitting the data packets to a switch card; and means for associating a plurality of lanes with a plurality of ports in response to the identified communication protocol, wherein the lanes are coupled to the received paddle card and the ports are operable to receive the data packets from the lanes.

17. A system for processing a data packet, comprising:

a paddle card slot operable to:
- receive a first paddle card operable to support a first communication protocol; and
- receive a second paddle card operable to support a second communication protocol; and a packet processor coupled to the paddle card slot, the packet processor comprising a first protocol state machine operable to establish a link operable to support the first communication protocol, and a second protocol state machine operable to establish a link operable to support the second communication protocol, the packet processor operable to:
- determine whether a received paddle card comprise the first paddle card or the second paddle card;
- identify the communication protocol supported by the received peddle card;
- select the first protocol state machine of the second protocol state machine to establish a link operable to support the Identified communication protocol;
- receive a plurality of data packets from the received paddle card;
- process the data packets according to the identified communication protocol;
- transmit the data packets to a switch card;
- receive a plurality of data packets from the switch card;
- process the data packets according to the identified communication protocol; and
- transmit the data packets to the received paddle card:
- wherein the received paddle card comprises a plurality of lanes operable to communicate the date packets and the packet processor comprises a receiving control unit comprising a plurality of ports and operable to associate the lanes with the ports in response to the identified communication protocol.

* * * * *